United States Patent [19]
David

[11] Patent Number: 5,156,256
[45] Date of Patent: Oct. 20, 1992

[54] ELEVATED AUXILIARY CONVEYING APPARATUS

[75] Inventor: Joseph S. David, Franklin, Pa.

[73] Assignee: Joy Technologies Inc., Pittsburgh, Pa.

[21] Appl. No.: 818,681

[22] Filed: Jan. 7, 1992

[51] Int. Cl.⁵ .......................................... B65G 15/26
[52] U.S. Cl. .................................. 198/588; 198/594; 198/861.2
[58] Field of Search ..................... 198/588, 594, 861.2; 299/43–45, 64–68

[56] References Cited

U.S. PATENT DOCUMENTS

| 928,183 | 7/1909 | Cunningham . | |
|---|---|---|---|
| 1,145,438 | 7/1915 | Potter . | |
| 1,462,078 | 7/1923 | Williams et al. . | |
| 1,822,930 | 9/1931 | Keller . | |
| 1,875,966 | 9/1932 | Webb et al. . | |
| 2,063,431 | 12/1936 | Grayson et al. | 83/63 |
| 2,169,424 | 8/1939 | Levin | 262/28 |
| 2,469,887 | 9/1939 | Nakahara et al. | 302/29 |
| 2,759,585 | 8/1956 | Timmons et al. | 193/36 |
| 2,890,788 | 6/1959 | Hill | 198/594 |
| 2,903,122 | 9/1959 | Geilenberg | 198/861.2 |
| 3,920,115 | 11/1975 | Craggs | 198/861.2 |
| 4,031,997 | 6/1977 | Nelson | 198/588 |
| 4,061,223 | 12/1977 | McGinnis | 198/861.2 |
| 4,339,031 | 2/1982 | Densmore | 198/861.2 |
| 4,784,257 | 11/1988 | Doerr | 198/594 |
| 4,798,279 | 1/1989 | Doerr et al. | 198/594 |
| 4,852,724 | 8/1989 | Bodimer | 198/861.2 |
| 4,896,764 | 1/1990 | Neunzert | 198/861.2 |

Primary Examiner—Joseph E. Valenza
Attorney, Agent, or Firm—Kirkpatrick & Lockhart

[57] ABSTRACT

An auxiliary conveying apparatus for supporting and guiding a mobile articulated conveyor between discrete elevated roadways located on first and second intersecting stationary conveyors. The apparatus includes two portable arcuate conveyor troughs that are arranged between the first and second conveyors at their point of intersection. Each conveyor section has an endless chain therein that is adapted to be driven in an orbit by a separate drive motor. Pad members are transversely attached to the endless chain and are adapted to contact and advance the mined ore from one end of the trough to the other as the endless chain is driven in an orbit. Corresponding arcuate track members are provided to interface with the support tracks located on the intersecting stationary conveyors and to guide the mobile articulated conveyor in an arcuate path above the arcuate conveyor troughs.

8 Claims, 8 Drawing Sheets

ELEVATED AUXILIARY CONVEYING APPARATUS

BACKGROUND OF THE INVENTION

1. Field of the Invention

The present invention relates to conveying apparatus and, more particularly, is directed to conveying apparatus used in connection with mobile articulated conveyors and their attendant stationary conveyors for conveying mined materials within a mine.

2. Description of the Invention Background

In the materials mining industry, especially in the underground mining of coal or the like, belt conveyors are used to transport the mined ore out of the mine. In particular, during the early stages of mine development, main haulageways are initially developed within the mine to accommodate stationary main belt conveyors that are used to transfer the mined ore from the mine. As the mine development progresses, roadways are branched off from these main haulageways to lesser roadways and finally to rooms which are generated specifically to retrieve the remaining coal or ore. Although the mine layout and development is somewhat dictated by the configuration of the particular seam, the roadways are typically developed perpendicular to the main haulageway.

As the network of lesser roadways is developed, separate stationary conveyors, known as panel conveyors, are installed therein to convey the mined ore to the main conveyor located in the main haulageway. Typically, those panel conveyors consist of short sections of conveyors that can be connected together to expand the conveyor network as needed.

In a preferred practice, a mobile conveyor may be used to convey the mined ore directly from the mining machine to the panel conveyors or to the main conveyor itself. Mobile articulated conveyors of the type disclosed in U.S. Pat. Nos. 4,031,997 and 4,852,724, can move under self-propulsion along mine roadways and around corners while receiving the mined ore directly from the mining machine and discharging it onto the main conveyor or one of the attending panel conveyors. Mobile articulated conveyors generally employ two different methods of discharging the mined ore onto an attending stationary conveyor. More specifically, the mobile articulated conveyor may be adapted to tram onto an elevated roadway track mounted directly above the stationary conveyor or, in the alternative, may be adapted to run beside the stationary conveyor by employing a "bridge" conveyor to transfer the ore from the discharge end of the mobile articulated conveyor to the attending section of stationary conveyor.

It is desirable, whenever there is sufficient height and clearance available, to arrange the mobile articulated conveyor to tram directly onto the attending stationary conveyor and thereby eliminate the maintenance problems associated with the use of the bridge conveyor. However, a problem which exists with that method of discharge is that of effecting a transition from discharging particulate matter onto the panel conveyor from a previous discharge position onto the main conveyor. Specifically, because the mobile conveyor's discharge follows a path which is not at a 90 degree angle, but rather "cuts the corner" on a fixed radius between the main and panel conveyor belts, at the juncture between the belts, there is no means provided for receiving the mobile conveyor's discharge as it trams between the belts. Accordingly, one practice which could be employed is to allow the miner to proceed in advance of the flexible conveyor and, instead, use shuttle cars to temporarily transport coal thereto. However, in that method an additional piece of expensive machinery is needed. Thus, the need exists for an auxiliary conveying system that enables a mobile articulated conveyor to relocate its discharge end between intersecting stationary conveyors without the use of a bridge conveyor and thereby provide the mining machine with sufficient additional maneuverability to do the mine development required to expand the network of stationary conveyors without the need for an additional mining machine.

SUMMARY OF THE INVENTION

The preferred embodiment of the present invention, as disclosed herein, includes various unique features for facilitating the transportation of material from a mining machine and its attendant self-propelled mobile articulated conveyor to corresponding stationary conveyors located remote from the mining machine. While these unique features are particularly adapted for conveying materials within an underground mining operation, it will be understood that some of the features may be incorporated, either singularly or together, into aboveground conveying systems that employ a network of intersecting stationary conveyors.

Pursuant to these and other objectives, there is provided an auxiliary coal conveying apparatus adapted to receive and convey mined material from a continuous mining machine and its attendant mobile articulated conveyor. A typical mobile articulated conveyor is adapted to tram onto an elevated roadway located on a corresponding stationary conveyor. The elevated roadway is normally fashioned out of heavy duty tubular steel and is adapted to guide the discharge end of the mobile articulated conveyor directly above the conveyor belt of the attending stationary conveyor. In accordance with typical mine development procedures, which at times may vary due to the seam configuration, a first stationary conveyor is arranged to discharge into a second downstream stationary conveyor which may be, for example, the main conveyor. Both of the first and second stationary conveyors are typically equipped with discrete, non-intersecting elevated roadways that are adapted to support and guide the discharge end of the mobile articulated conveyor in discrete paths above each of those stationary conveyors.

The conveying apparatus of the present invention includes two arcuate sections of auxiliary conveyor that cooperate together to form an arcuate path between the first and second stationary belt conveyors that substantially corresponds with the tramming radius of a mobile articulated conveyor. The sections of auxiliary conveyor consist of portable conveyor frames that are fastened together to form an arcuate conveyor trough. Each auxiliary conveyor section has a drive and idler shaft adapted to suspend an endless chain therebetween. A drive motor is coupled to each drive shaft for driving the corresponding endless chain in an orbit within the arcuate trough. Each endless chain has a plurality of scraper pads transversely bolted thereto that are adapted to advance the mined ore within the trough. The arcuate conveyor sections are arranged between the intersecting stationary conveyors at their point of intersection and cooperate together to discharge the mined material onto the downstream stationary conveyor. Elevated support tracks are provided on each section of auxiliary conveyor for guiding the mobile articulated conveyor in a corresponding arcuate path. Appropriate sections of interconnected transition guides are provided to connect the elevated roadway tracks located on the intersecting stationary conveyors to the support tracks provided on the arcuate sections of auxiliary conveyor.

As the mine is developed, the mining machine with its attending mobile articulated conveyor, is free to mine as far as it can reach in predetermined directions while the discharge end of the mobile articulated conveyor remains movably supported on the elevated roadway tracks mounted to a first stationary conveyor. At some time during the mine development, it becomes desirable to install a second stationary conveyor in a branching relationship with respect to that first stationary conveyor. At this stage in the mine development, the mobile articulated conveyor is retracted along the first stationary conveyor far enough so that a drive and a short section of a second stationary conveyor can be installed. The auxiliary conveyor sections and their corresponding support tracks are then installed between the first and second stationary conveyors in the manner described hereinabove. By installing the sections of auxiliary conveyor and their corresponding support tracks, the mining machine and its attendant mobile articulated conveyor are afforded additional maneuverability to enable the mining machine to do the development required to further extend the new branch of stationary conveyors without the assistance of a separate mining machine. The auxiliary conveyor sections and support tracks of the present invention are used in this manner until the entire mobile articulated conveyor, when retracted, lies along the second stationary conveyor. At this time, the sections of auxiliary conveyor and related sections of support track may be removed and stored until they are needed at another point of intersection.

Accordingly, the present invention provides solutions to the aforementioned problems encountered when using mobile articulated conveyors and elevated roadway discharge systems. In particular, the auxiliary conveying system of the present invention enables a mobile articulated conveyor to traverse between discrete roadways mounted to intersecting stationary conveyors without spillage or loss of the conveyed material or interruption of the mining process. As such, the added maneuverability afforded by the present invention enables the mining machine to develop the roadways necessary to expand the system of stationary conveyors without the aide of another mining machine. In addition to this solution, other details, objects, and advantages will become apparent as the following detailed description of the present preferred embodiment thereof proceeds.

BRIEF DESCRIPTION OF THE DRAWINGS

In the accompanying drawings, I have shown a present preferred embodiment of the invention wherein like reference numerals are employed to designate like parts and wherein.

DETAILED DESCRIPTION OF THE PREFERRED EMBODIMENTS

Referring now to the drawings for the purposes of illustrating the present preferred embodiment of the invention only and not for purposes of limiting the same, the Figures show an auxiliary coal conveying apparatus generally designated as 10.

Figure 1:
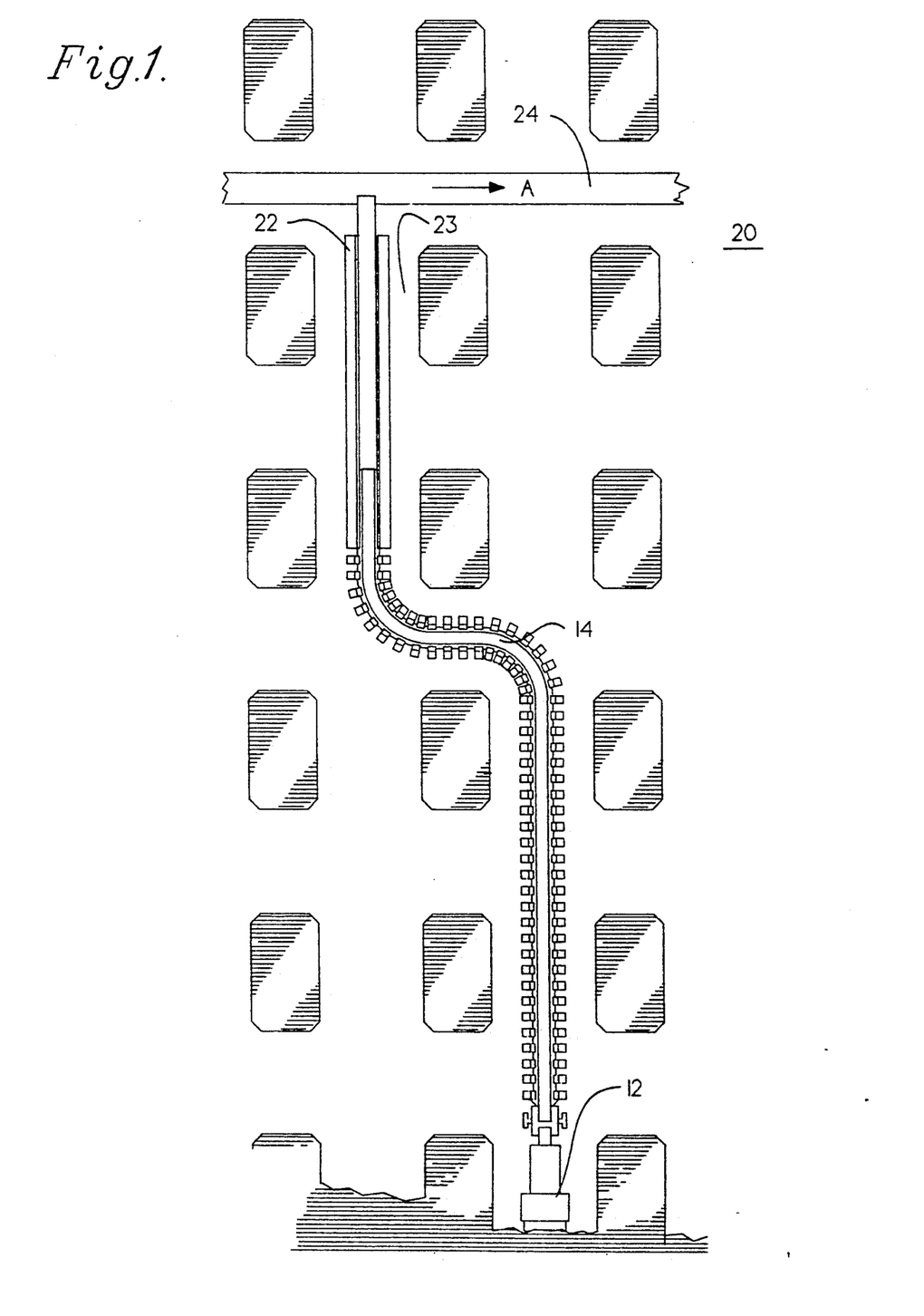
FIG. 1 is a plan view of a typical mining operation employing a mobile articulated conveyor and stationary conveyors for conveying the mined material out of the mine.

More particularly and with reference to FIG. 1, there is shown a typical underground mining operation wherein a mining machine 12 is employed to extract the ore from the mine. A mobile articulated conveyor 14 is attached to the mining machine 12 and serves to convey the mined ore to a first stationary conveyor 22 located remote from the mining machine 12 in a roadway 23. The conveyor 22, also known as a panel conveyor, is adapted to receive the mined ore from the mobile articulated conveyor 14 and discharge it onto a second stationary conveyor 24 as depicted by the arrow "A". The conveyor 24, also known as a main conveyor, extends along a main haulageway 20 and serves to transport the mined material out of the mine.

Figure 2:
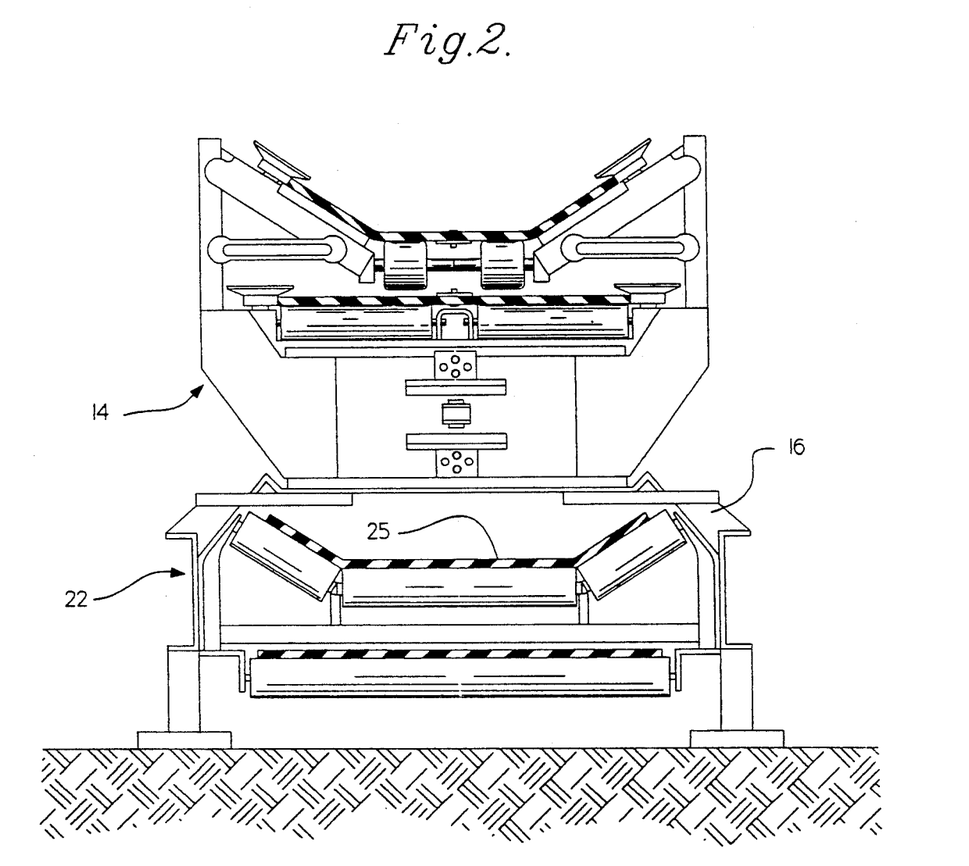
FIG. 2 is an end view of a typical elevated roadway discharge arrangement.

In typical mining operations, the mobile articulated conveyor 14 is adapted to tram onto elevated support tracks 16 that are mounted above an endless belt 25 on, for example, conveyor 22 (see FIG. 2). The elevated support tracks 16 create discrete, non-intersecting roadways above the conveyors 22 and 24 and therefore, the mobile articulated conveyor 14 is incapable of switching between the conveyors 22 and 24 when the location of the mining machine 12 so requires. The instant invention is directed toward a means for providing the mining machine 12 and its attendant mobile articulated conveyor 14 with additional maneuverability by enabling the mobile articulated conveyor to tram between the discrete roadways mounted to the intersecting stationary conveyors without loss of mined material or interruption of the mining process.

Figure 3:
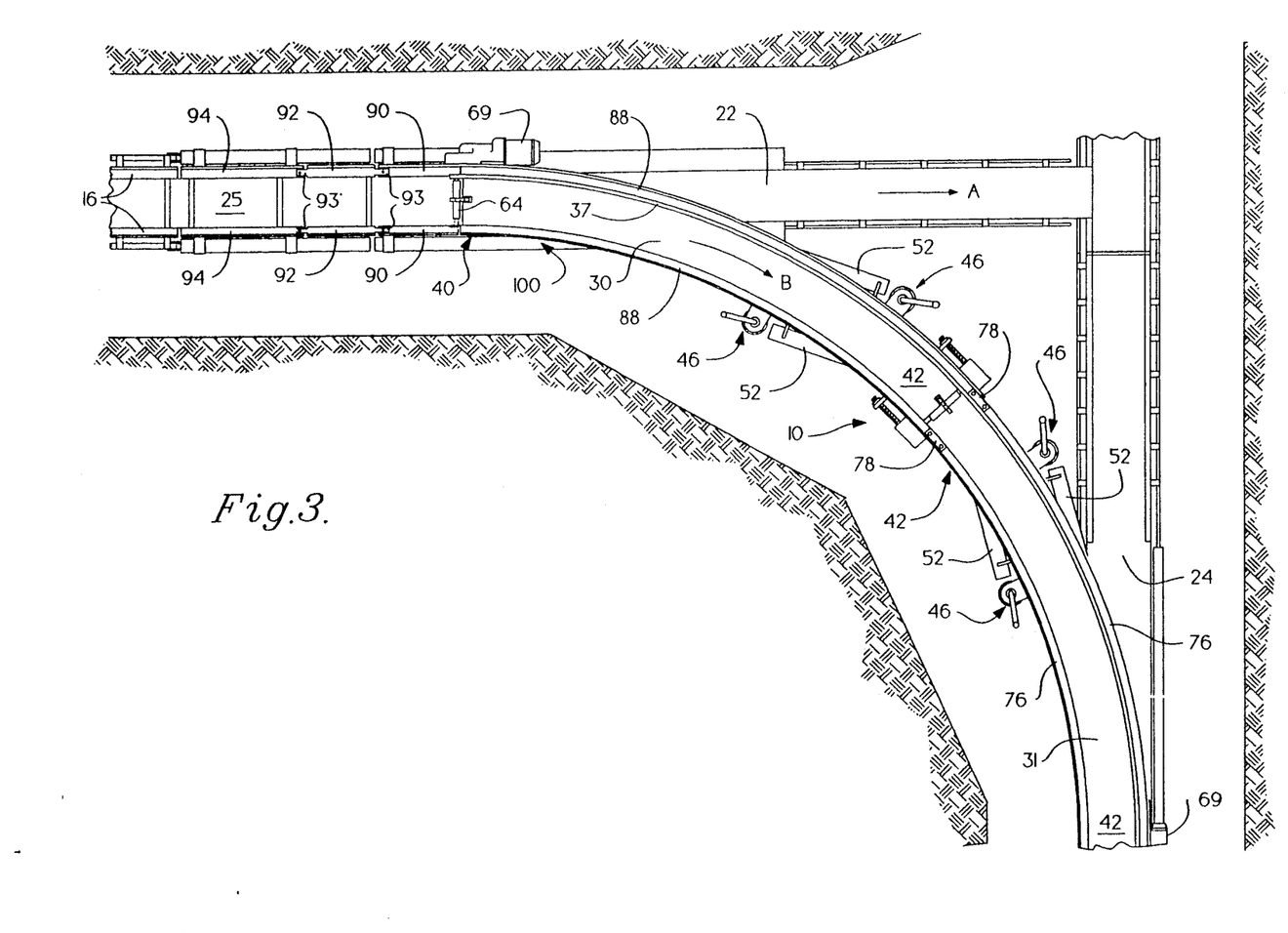
FIG. 3 is a plan view of the auxiliary conveying system of the present invention.
Figure 4:
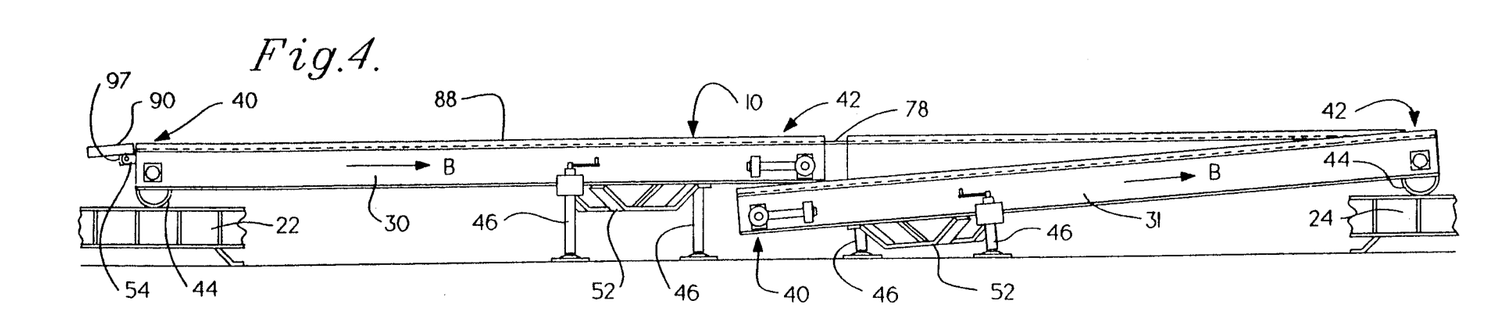
FIG. 4 is a side development view showing the arrangement of the arcuate conveyor sections of the present invention and their relationship to the corresponding sections of intersecting stationary conveyors.

The above-described problem is alleviated by the provision of an auxiliary conveying apparatus 10. The auxiliary conveying apparatus 10 of the present invention, as illustrated in FIGS. 3 and 4, consists of two portable conveyor sections 30 and 31 that are positioned between the conveyors 22 and 24 at their point of intersection. As will be discussed below, the auxiliary conveyor sections 30 and 31 cooperate together to form an arcuate track and conveyor system for receiving the mined ore from the discharge end of the mobile articulated conveyor 14 as it trams between the conveyors 22 and 24. As most particularly shown in FIG. 4, the upstream conveyor section 30 is adapted to discharge into the downstream conveyor section 31 which ultimately discharges the ore onto the conveyor 24. The flow of the mined material is depicted by the arrow "B" on FIG. 4. While I have found it convenient to use two separate conveyor sections as described immediately above to facilitate handling and transport in the confines of a mine, it will be appreciated by those of ordinary skill in the art that the present invention may be practiced by using one conveyor or more than two separate conveyor sections.

Figure 5:
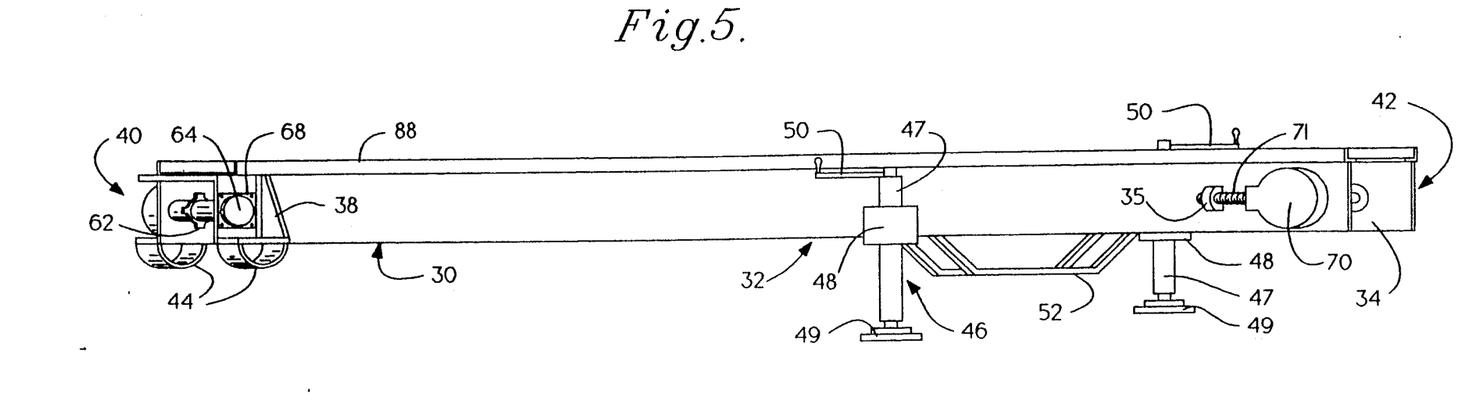
FIG. 5 is a side view of an arcuate conveyor section of the present invention.
Figure 6:
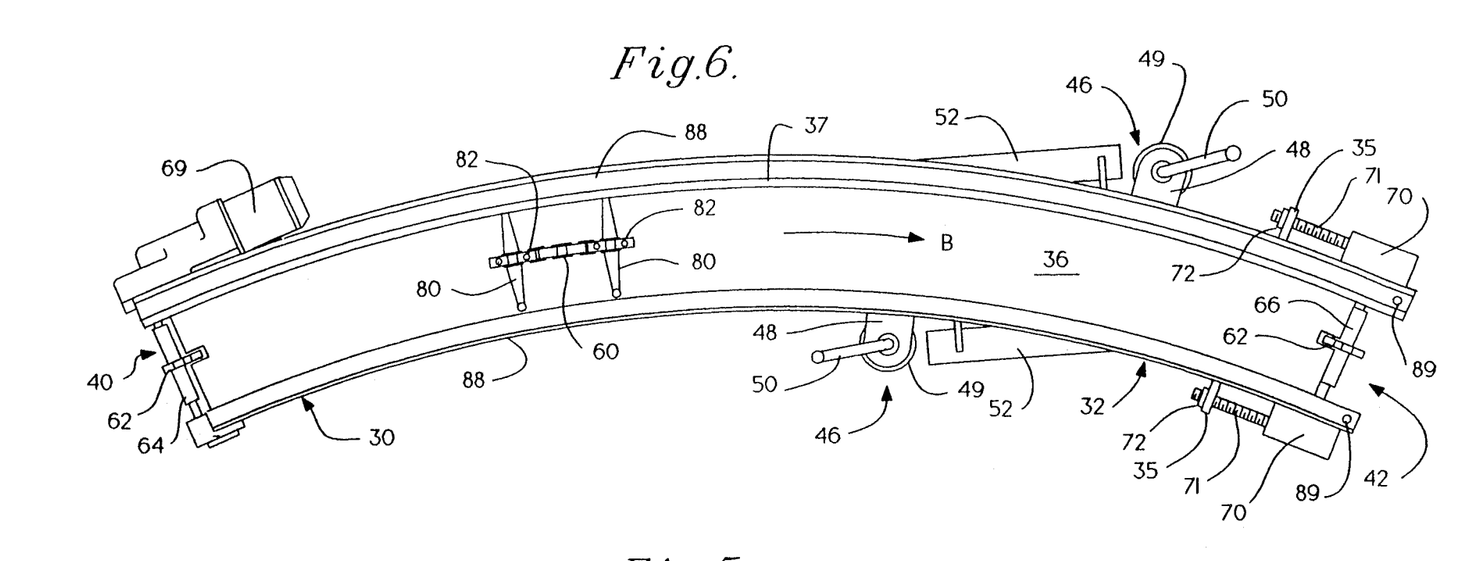
FIG. 6 is a top view of an arcuate conveyor section of FIG. 5.
Figure 7:
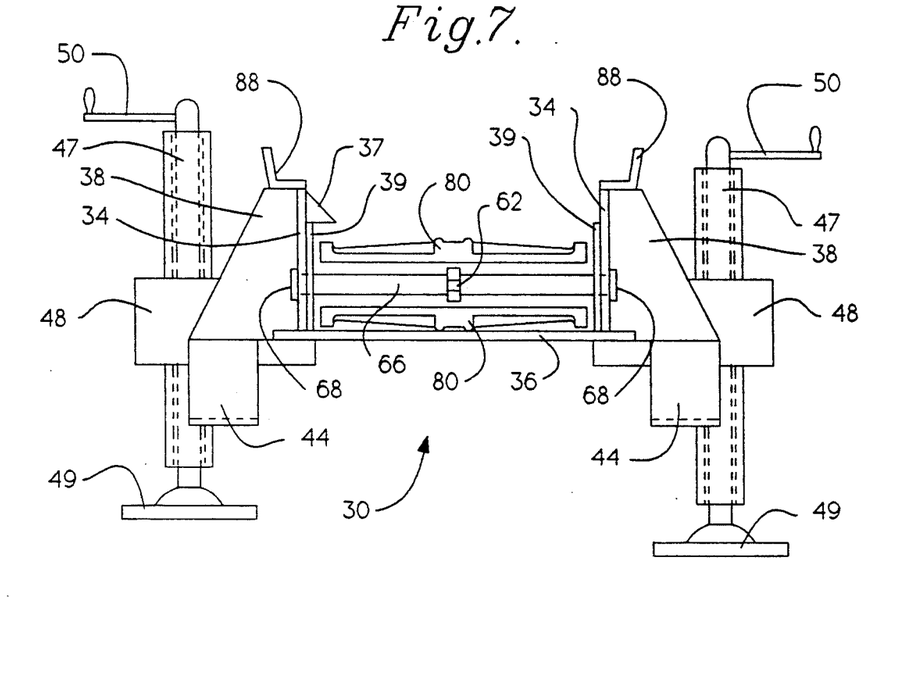
FIG. 7 is an end view of the conveyor section of FIG. 5.

FIGS. 5, 6 and 7 diagrammatically illustrate the basic construction of the conveyor section 30. However, it will be understood that except for the differences outlined below, the conveyor section 31 is similarly fabricated and includes the same basic structural elements as the conveyor section 30. In particular, the conveyor sections 30 and 31 each consist of an arcuate trough that is formed from metallic side plates 34 and a corresponding arcuate bottom member 36 that is affixed therebetween (see FIG. 7). The side plates 34 and the bottom member 36 each have a radius that corresponds to the tramming radius of the mobile articulated conveyor 14.

The conveyor sections 30 and 31 each have a load end 40 and a discharge end 42. As can be seen in FIG. 4, the load end 40 of the conveyor section 30 is adapted to rest on the frame of the conveyor 22. More specifically, arcuate support pads 44 are welded to the bottom member 36 to enable the conveyor section 30 to be slid into position along the frame of conveyor 22 (see FIGS. 4 and 5). Similarly, arcuate support pads 44 are welded to the discharge end 42 of the conveyor section 31 to enable the discharge end 40 to be slid into position on the frame of conveyor 24. In the preferred embodiment, gusset plates 38 are welded between the support pads 44 and the side plates 34 to provide the side plates 34 with additional lateral support. While the preferred support pads 44 are arcuate-shaped, it will be understood that the support pads 44 may be provided in a variety of configurations adapted to provide sliding support for the conveyors 30 and 31.

The discharge end 42 of the conveyor section 30 and load end 40 of the conveyor section 31 are preferably supported by at least two leveling screws 46 that are affixed to the side plates 34 as shown in FIGS. 3-7. More specifically, the leveling screws 46 preferably consist of a screw 47 and nut 48 arrangement with a ball and socket pad 49 attached thereto. A hand crank 50 is also preferably attached to the end of the screw member 47 to simplify the adjustment process. Those of ordinary skill in the art, however, will appreciate that other forms of mechanical and hydraulic leveling devices may also be used. In addition, as shown in FIGS. 3, 4 and 5, skid pads 52 are rigidly attached to each of the bottom members 36 to enable the conveyor sections 30 and 31 to be pushed or pulled along the mine floor when being relocated. Although the skid pads 52 may be attached anywhere along the bottom member 36, I have found the location depicted in FIGS. 3, 4 and 5 to be superior.

As illustrated in FIGS. 5 and 6, drive shafts 64 are rotatably mounted to the load end 40 of the conveyor 30 and the discharge end 42 of the conveyor 31. In the preferred embodiment, the drive shafts 64 are rotatably fastened to the side plates 34 by bearing support members 68 and are directly coupled to independent drive motors 69. Idler shafts 66 are similarly rotatably fastened to the discharge end 42 of the conveyor 30 and the load end 40 of the conveyor 31 by adjustable bearing support members 70. In particular, the shafts 66 extend through corresponding slots (not shown) provided in the side plates 34 to be rotatably received in the adjustable bearing support members 70. As can be seen in FIGS. 5 and 6, the adjustable bearing support members 70 each have a screw member 71 threadedly attached thereto that is adapted to be received in corresponding internally threaded members 35 that are rigidly fastened to the side plates 34. The operable position of each shaft 66 may be easily adjusted by rotating the screw members 71 within the internally threaded members 35. The support members 70 are secured in that position by tightening the locking nuts 72 provided on each of the screw members 71. Those of ordinary skill in the art will appreciate, however, that other forms of chain tensioners and shaft adjustment devices may also be used.

Figure 8:
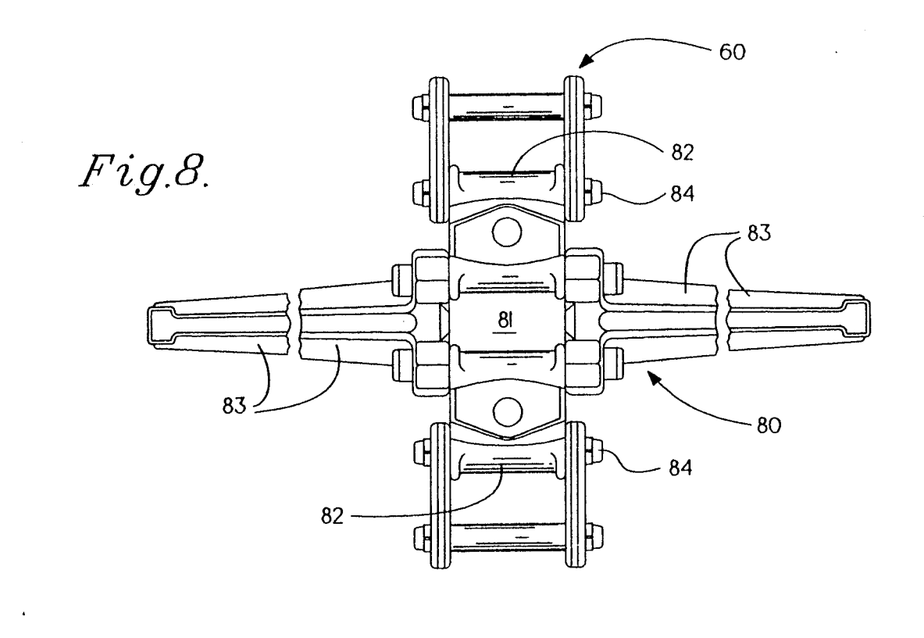
FIG. 8 is a top view of the scraper pad assembly of the present invention.

The mined ore is advanced within the conveyor sections 30 and 31 by endless chains 60 that are supported on chain engaging sprockets 62 located on the shafts 64 and 66. As shown in FIG. 6, the endless chains 60 are driven in an orbit around the shafts 64 and 66 in the direction indicated by the arrow "B". Scraper pads 80 are preferably assembled into each of the endless chains 60 at equal intervals and are adapted to advance the mined ore along the conveyor sections 30 and 31. In the preferred embodiment, as shown in FIGS. 6 and 8, the scraper pads 80 have a center portion 81 and two laterally extending legs 83. As most particularly shown in FIG. 8, two receptacle portions 82 are pivotally attached to the center portion 81 of each scraper pad 80. Each receptacle portion 82 has a bore (not shown) therethrough adapted to receive a chain pin 84 therein so that the pads 80 may be assembled into the endless chain 60. It will be understood that scraper pads 80 must be of sufficient size and length so as to fit between the side plates 34 and provide sufficient impetus to move the ore within the arcuate trough. Experience has shown, however, that the distance between the ends of the scraper pads 80 and the side plates 34 should be kept to a minimum to prevent the intrusion of larger pieces of ore therebetween which could impede the movement of the endless chain 60. Those of ordinary skill in the art, however, will recognize that scraper pads 80 may be provided in a myriad of compatible shapes and sizes and may be attached or assembled into the endless chain 60 by any suitable fastening means.

Also in the preferred embodiment, as can be seen in FIG. 7, a guide member 37 is preferably attached to one of the side plates 34 to limit the vertical movement of the scraper pads 80 since the tension on the curved chain 60 tries to make the scraper pads 80 roll up out of the trough. To protect the side members 34 from the frequent contact with the scraper pads 80 and the ore, I prefer to attach hardened wear plates 39 to the inside of side members 34 (See FIGS. 7 and 13). It will be understood that the wear plates 39 extend the entire length of the conveyor sections 30 and 31 and are removably attached thereto by bolts (not shown). It will be further understood that when the wear plates 39 are employed, the length of the scraper pads 80 must be shortened so that the scraper pads 80 may freely extend therebewteen.

The mobile articulated conveyor 14 is supported and guided above the conveyor sections 30 and 31 by arcuate track members 88. The arcuate track members 88 preferably consist of steel angles that are welded or bolted to the to the top of the side plates 34 as shown in FIG. 7. It will be understood that the arcuate track members 88 are adapted to receive the crawler pads of a mobile articulated conveyor 14 to thereby guide and support the mobile articulated conveyor 14 in a corresponding path above the conveyor sections 30 and 31.

Figure 9:
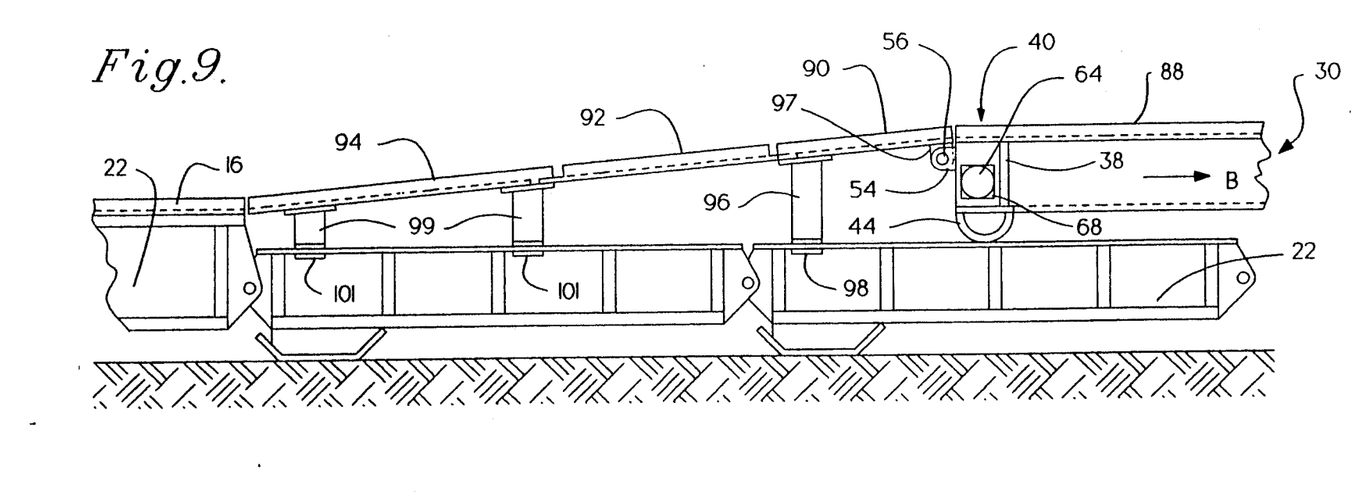
FIG. 9 is a side elevational view depicting the assembly of transition guides of the present invention.
Figure 10:
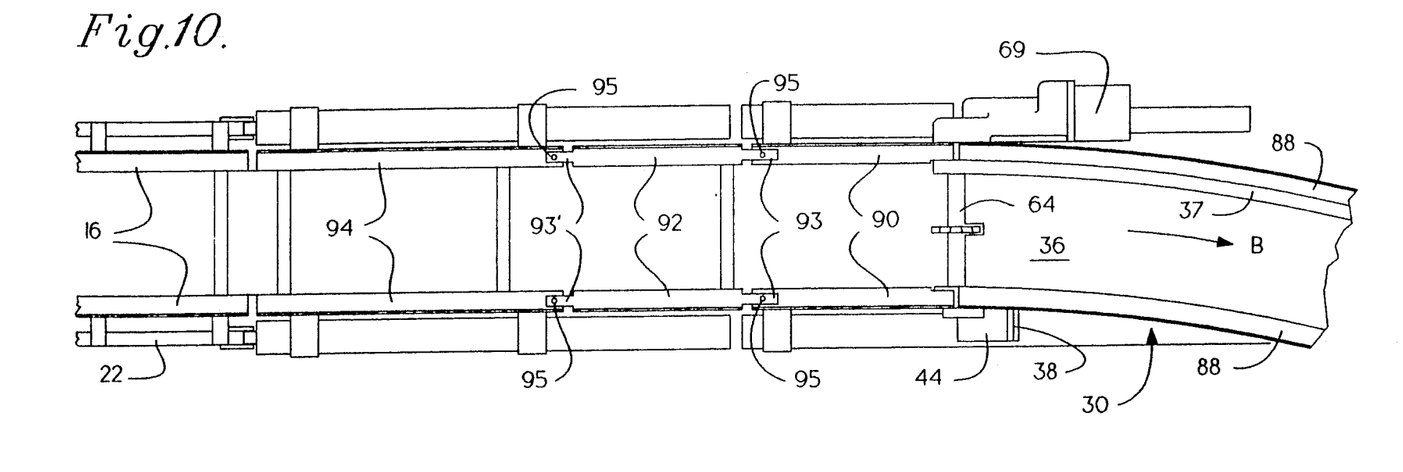
FIG. 10 is a top view of a conveyor section and corresponding transition guides of the present invention.

As shown in FIGS. 9 and 10, transition guide tracks 90, 92 and 94 are provided to connect the elevated support tracks 16 on the conveyors 22 and 24 to the track members 88 located on the conveyor sections 30 and 31. In particular, the first transition guide tracks 90, are removably attached to the guide tracks 88 by clevis members 54. In the preferred embodiment, clevis members 54 are provided on the load end 40 of the conveyor section 30 and the discharge end 42 of the conveyor section 31 and are adapted to receive a downward extending tab member 97 that is rigidly fastened to each of the corresponding transition guide tracks 90. Apertures 56 are provided in each clevis member 54 that substantially correspond with an aperture (not shown) provided in each tab member 97. A bolt or pin (not shown) is inserted through the apertures 56 and the aperture in tab member 97 to fasten the transition guide tracks 90 to the support tracks 88. Those of ordinary skill in the art, however, will recognize that the transition guide tracks 90 may be removably attached to the support tracks 88 by any suitable fastening means. In addition, each transition guide track 90 has a downwardly extending vertical support member 96 rigidly attached thereto for fastening the transition guide track 90 to the frame of the conveyors 22 or 24. In the preferred embodiment, bolt pads 98 are attached to he vertical support members 96 to enable the support tracks 96 to be bolted to the frame of the conveyor sections 22 or 24.

Bolted to the ends of the guide tracks 90 are intermediate guide track portions 92. More specifically, the intermediate guide tracks 92 each have an outwardly extending tab member 93 that is adapted to be removably attached to the corresponding transition guide 90 by bolts or pins 95. Finally, transition guide tracks 94 are removably fastened to the ends of the intermediate guide tracks 92 to complete the transition between the support tracks 16 located on the conveyors 22 and 24 and the support tracks 88 on the conveyor sections 30 and 31. In particular, the transition guide tracks 94 are fastened to the outwardly extending tab members 93' of the intermediate guide tracks 92 by bolts 95. In addition, at least two vertical support members 99 are attached to each track member 94 to enable the track member 94 to be removably fastened to the conveyors 22 or 24. In the preferred embodiment, bolt pads 101 are attached to the vertical support members 99 to thereby enable the track members 94 to be bolted to the corresponding frames of conveyors 22 and 24. As most particularly shown in FIG. 9, the free ends of the transition guides 94 are butted against the ends of the elevated roadways 16 on the conveyors 22 and 24 to enable the auxiliary conveyor system 10 of the present invention to interface with a standard section of stationary conveyors 22 or 24. It will be appreciated that the track members 90, 92 and 94 cooperate together to provide a gradual transition between the support tracks 16 on the corresponding sections of stationary conveyors 22 and 24 and the support tracks 88 provided on the conveyor sections 30 and 31.

Figure 11:
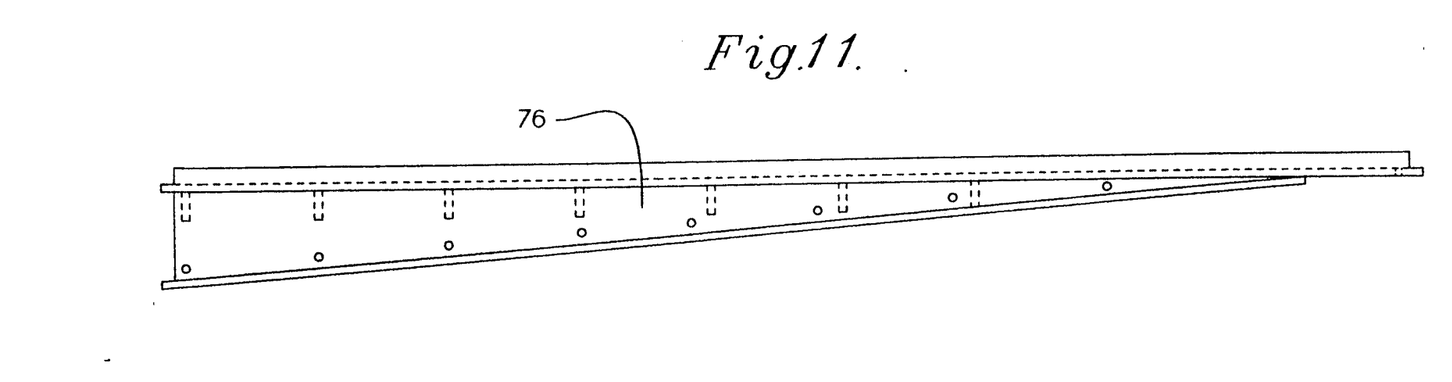
FIG. 11 is a side view of a support track section of the present invention.
Figure 12:
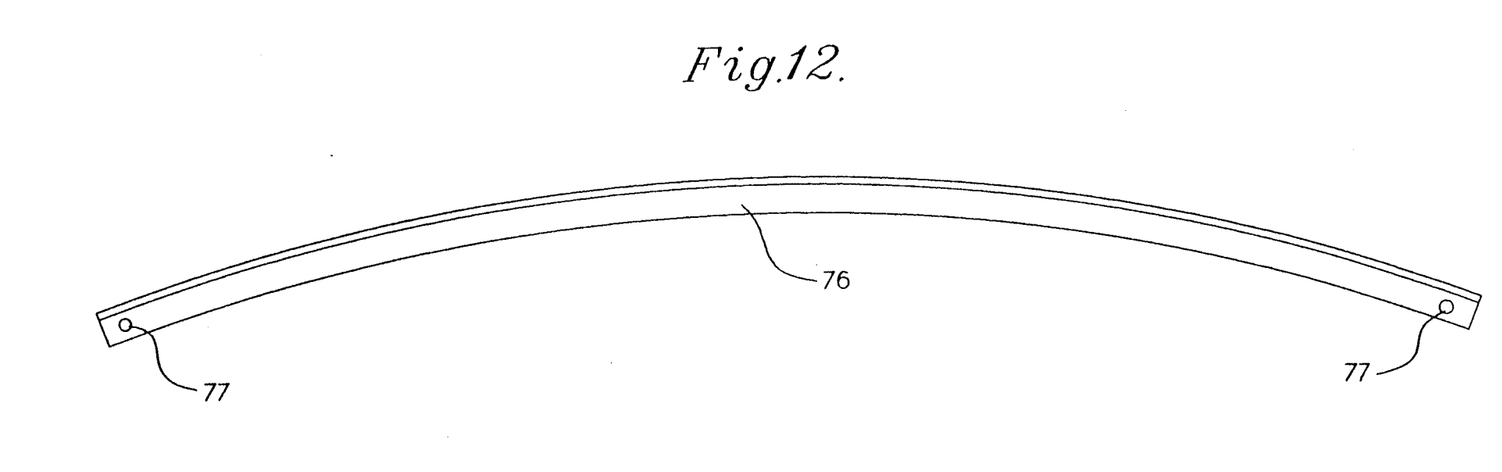
FIG. 12 is a top view of the support track section of FIG. 11.
Figure 13:
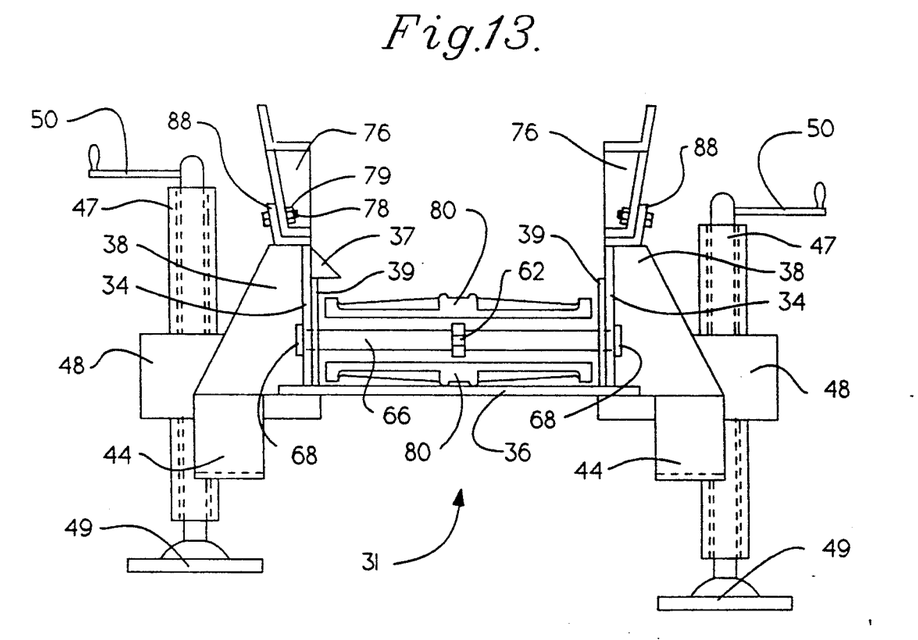
FIG. 13 is an end view of a conveyor section of the present invention with the support track sections of FIG. 12 attached thereto.

The auxiliary conveying system 10 of the present invention is designed to be utilized when the mining machine 12 can no longer continue to mine and develop a particular area due to the inability of the mobile articulated conveyor 14 to switch its discharge end, for example, from the conveyor 24 to the conveyor 22. At this stage in the mine development, the mobile articulated conveyor 14 is retracted along the conveyor 24 far enough to enable a section of the conveyor 22 to be installed as shown in FIG. 3. Thereafter, the arcuate conveyor sections 30 and 31 are installed between the conveyors 22 and 24 as illustrated in FIGS. 3 and 4. In particular, the conveyor section 30 is arranged to discharge into the conveyor section 31 which ultimately discharges into the conveyor 24. In addition, removable wedge-shaped track sections 76 are preferably bolted to the track sections 88 of the conveyor section 31 to provide a level support track above the conveyor sections 30 and 31 (see FIGS. 11 and 12). More particularly, as shown in FIG. 13, track sections 76 are adapted to be received in the guide tracks 88 located on the conveyor section 31. The guide track 76 is removably fastened to the guide tracks 88 by bolts 78 and nuts 79. In the preferred embodiment, the track sections 76 are attached to the track sections 88 located on the conveyor section 30 by connecting members 78 (see FIGS. 3 and 4). More specifically, the connecting members 78 have apertures in each end (not shown) that correspond with the apertures 77 and 89 in the ends of the track members 76 and 88 respectively. Bolts or pins are (not shown) are inserted through the apertures 77 and 89 to secure the connection member 78 to the track members 76 and 88. It will be appreciated that the track members 90, 92, 94 and 76 in conjunction with the tracks 88 on the conveyor sections 30 and 31, form a continuous elevated roadway generally designated as 100. As such, the mobile articulated conveyor 14 is permitted to continuously discharge onto the conveyor sections 30 and 31 while traversing between the conveyors 22 and 24.

The present invention described hereinabove provides solutions to the aforementioned problems associated with the use of mobile articulated conveyors and the corresponding attending stationary conveyors. In particular, the present invention provides the mobile articulated conveyor with added maneuverability to thereby enable the mining machine to develop the necessary roadways and clearance generally needed to expand the network of conveyors without requiring a second mining machine. In addition, the above-mentioned solution is achieved without the use of a bridge conveyor thereby eliminating the various maintenance problems commonly associated therewith. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for supporting and guiding mobile articulated conveyor between discrete first and second elevated roadways located on first and second intersecting conveyors, respectively, comprising:

conveying means configured to receive conveyed material from the mobile conveyor and discharge the material onto the second conveyor;

means for supporting said mobile conveyor above said conveying means;

means for guiding the mobile conveyor between positions on said first roadway, on said means for supporting and on said second roadway; and means for connecting said guiding means to the discrete elevated roadways located on the first and second conveyors.

2. The apparatus recited in claim 1 wherein said conveying means comprises at least one arcuate conveyor.

3. The apparatus recited in claim 2 wherein each said arcuate conveyor comprises:

an arcuate trough member, said arcuate trough member being constructed to receive the mined material from the mobile conveyor therein; and advancing means attached to said trough member for transferring the conveyed material from one end of said trough member to the other end of said trough member for discharge therefrom.

4. The apparatus recited in claim 3 wherein each said advancing means comprises:

an endless member rotatably supported within said trough member;

drive means for driving said endless member in an orbit within said trough member; and a plurality of pad members fastened to said endless member and cooperating therewith to advance the conveyed material from one end of said trough member to the other end of said trough member for discharge therefrom.

5. The apparatus of claim 4 wherein said means for connecting comprises a plurality of interconnected track members, said interconnected track members being removably fastened to the first and second conveyors and cooperating with the discrete elevated roadways and said guiding means to form a continuous elevated roadway constructed to guide the mobile conveyor in an elevated arcuate path between the first and second conveyors.

6. The apparatus recited in claim 5 wherein each said endless member comprises an endless chain.

7. The apparatus recited in claim 6 wherein a plurality of leveling means are attached to each said arcuate trough member.

8. The apparatus recited in claim 1 wherein said conveying means comprises two arcuate conveyors.

* * * * *